J. W. Singleton,
Automatic Gate,
No. 60,798. Patented Jan. 1, 1867.
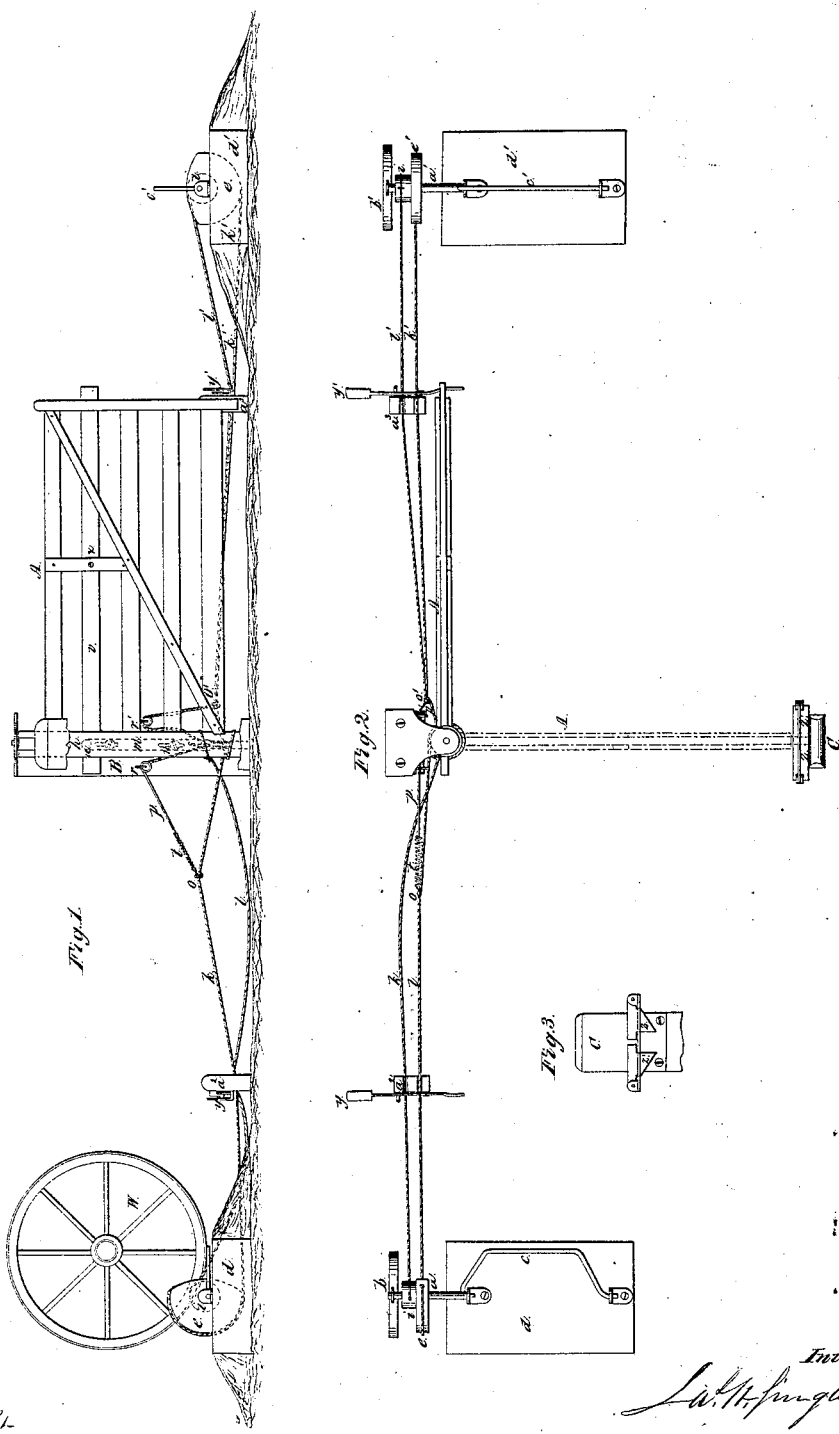

United States Patent Office.

JAMES W. SINGLETON, OF QUINCY, ILLINOIS.

Letters Patent No. 60,798, dated January 1, 1867.

---

IMPROVEMENT IN GATES.

---

The Schedule referred to in these Letters Patent and making part of the same.

---

Be it known that I, JAMES W. SINGLETON, of the city of Quincy, in the county of Adams, and State of Illinois, have invented certain new and useful Improvements in Apparatus for Opening and Closing Gates; and I do hereby declare that the following is a full, clear, and exact description of the construction, arrangement, and operation of the same, reference being had to the annexed drawings, making a part of this specification, in which—

Figure 1 represents a front elevation of an open gate and of the apparatus used to operate it; and Figure 2 a plan view of the same.

Figure 3 is an elevation of part of the inside of the striking post, showing the catches.

The letters of reference indicate the same parts in the different figures.

My improvements relate to apparatus for opening and closing gates, and fastening and releasing them when open or closed, by the action of the wheel of a carriage upon crank-levers placed in the roadway, one of which, actuating certain devices hereinafter described, causes the gate to be unlatched, opened, and held in that position. The wheel passing over the lever on the opposite side of the gate causes it to be released, closed, and latched. The said levers are reciprocal in their operation, the depression of either of them towards the gate producing the first-mentioned effect, and their depression from the gate the latter.

The gate is hung by vertical journals or pivots, the lower one resting in a step, the upper one having its bearing in a plate fixed to the gate-post, B; or it may be hinged in any equivalent manner which will admit of its free movement to the extent of 180°. When closed it is held in that position by two drop-latches, $z\ z'$, fixed upon the post, C. On either side of the gate-post B, in the line therewith, and at a distance therefrom sufficient to admit the length of a carriage and horses, I place the apparatus for actuating the gate. They are identical in construction and operation, and consist of the rock-shafts, $a\ a'$, having their bearings on the blocks, $b\ b'$ and $d\ d'$, raised a sufficient distance above the surface of the ground to admit of the free revolution of the segment-wheels, $e\ e'$, which, with the smaller wheels, $i\ i'$, are keyed upon the rock-shafts $a\ a^1$. Cranks, $c\ c'$, are each attached at one end to the rock-shafts $a\ a^1$, and have their outer bearings on the blocks $d\ d'$. They act as levers to rotate the shafts, and are elongated in order to facilitate their being struck by the wheel of an approaching vehicle. The segments $e\ e'$ have attached to their peripheries cords, $k\ k'$, which, after taking a turn once round the heel-post, $h$, of the gate, A, are secured thereto. The functions of these cords are to open the gate when actuated by either of the segments $e\ e'$ when revolved towards the gate. These cords may be substituted by chains or by rods at those parts where flexibility is not required. Upon the gate-post B a slotted plate, $m$, is secured by means of screws or bolts passing through the slots, $n$, admitting of a limited vertical action. At $o\ o'$, on $k\ k'$, branch cords, $p\ p'$, are attached, leading over pulleys, $r\ r'$, to an eye-bolt, $s$, in the plate $m$. These branches may be supplied with elastic springs, $t$, and their function is to elevate the plate $m$ when tension is applied thereto. When this tension is not applied the plate $m$ falls by its own gravity, or it may be aided in its descent by a suitable spring or weight. At the upper end of $m$ is a forward projection, $u$, which, when the gate is closed, rests under the end of the bar, $v$, which, working in slots, is pivoted at $x$. The other end of this bar forms the latch, and is held between the gravitating catches $z\ z'$, upon the striking-post C. Short posts, $a^2$ and $a^3$, are placed in suitable positions to receive the end of the gate A when opened in either direction. Slots are cut in these posts to admit the cords $k\ k'$ and $l\ l'$ to rest therein. Pivoted to the side of each is a counter-balanced catch, $y\ y'$, for the purpose of holding back the gate A when open in either direction.

The opening and closing of the gate are performed as follows, viz: A carriage approaching the closed gate is caused to run one wheel, $w$, against the crank-lever $c$, causing it to describe an arc of 90°, or the fourth part of a circle, with the shaft $a$ and segment-wheel $e$; the cord $k$, through its branch at $o$, elevates the plate $m$; the projection $h$ raises the end of the pivoted rail or bar $v$, lowering its opposite end, and thereby releasing the gate from the catch $z'$, the main part of the cord simultaneously exerting its force upon the heel-post, round which it is wound, swings it round in a direction from the carriage against the post $a^3$, where it is caught and held back by the catch $y'$. As soon as the carriage passes the crank it resumes its vertical position by the preponderance of the opposite portion of the segment, which may be increased by weighting it if its form does not produce sufficient effect. The carriage is then directed against the lever $c'$, which, being moved 90° from the gate, exerts a tension on the cord $l'$, which, rising in its slot, trips the catch $y'$ and releases the gate, at the same time swinging it towards the post C, where, striking against the inclined edge of the catch $z'$, it elevates it, and is caught between the vertical edge of $z$, while that of $z'$ falls into position and prevents its return. If more than one or a train of vehicles have to pass through, it is only necessary that the wheel of the leading one should strike the lever $c$, but no harm is done if all should do so; but the last carriage only should strike the other lever, as otherwise the gate would be prematurely closed.

The above-described apparatus may either be operated entirely above the surface of the ground, as shown in the drawings, or the cords may be conducted through tubes below the ground. It is equally applicable to double gates; but when they are used the heel-posts should be elongated and the steps set in a box beneath the surface, a crossed band passing under-ground round the heels of both gates, causing them to open and close simultaneously.

What I claim as my invention, and desire to secure by Letters Patent, is—

The apparatus, constructed and arranged substantially as herein described, for the purpose of opening and closing gates and fastening and releasing them when either open or closed, as herein set forth.

JAS. W. SINGLETON.

Witnesses:
  JOHN S. HOLLINGSHEAD,
  WM. J. FAHERTY.